United States Patent

Huang et al.

[11] Patent Number: 5,632,226
[45] Date of Patent: May 27, 1997

[54] BICYCLE SPEED INDICATOR

[75] Inventors: Jack Huang, Tainan; Chan-Hua Feng, Hsinchu; Chung-Ping Chiang, Kaohsiung, all of Taiwan

[73] Assignee: Industrial Technology Resarch Institute, Hsinchu, Taiwan

[21] Appl. No.: 534,533

[22] Filed: Sep. 27, 1995

[51] Int. Cl.$^6$ .................. G01D 13/00; G09F 9/00
[52] U.S. Cl. .............. 116/295; 116/28.1; 116/284; 116/309; 116/322; 74/489
[58] Field of Search .............. 116/28.1, 56, 62.3, 116/284, 294, 295, 298, 299, 309, 321–323; 74/475, 489

[56] References Cited

U.S. PATENT DOCUMENTS

| | | | |
|---|---|---|---|
| 234,063 | 11/1880 | Farnsworth | 116/133 |
| 2,856,388 | 10/1958 | Strunk | 116/311 |
| 3,524,979 | 8/1970 | Cohen | 116/28.1 |
| 3,896,759 | 7/1975 | Ogura | 116/28.1 |
| 3,941,080 | 3/1976 | Ford | 116/318 |
| 3,965,763 | 6/1976 | Wechsler | 116/28.1 |
| 4,055,093 | 10/1977 | Ross | 116/28.1 |
| 5,012,692 | 5/1991 | Nagano | 74/489 |
| 5,178,033 | 1/1993 | Kund | 116/28.1 |
| 5,325,735 | 7/1994 | Nagano | 74/489 |
| 5,476,019 | 12/1995 | Cheever et al. | 74/489 |

*Primary Examiner*—William A. Cuchlinski, Jr.
*Assistant Examiner*—Andrew Hirshfeld
*Attorney, Agent, or Firm*—W. Wayne Liauh

[57] ABSTRACT

A speed indicator for bicycles for indicating the shifting action of the bicycle and a speed sign at each state of shift includes a driving wheel driven by a takeup reel of a shifting device, a resilient strip driven by the driving wheel, and a track along which the resilient strip may displace. When the resilient strip displaces along the track, a shift sign preformed on the resilient strip may be shown through an indicating element provided on the track. The resilient strip may be adapted for use in vertically or horizontally oriented tracks of any construction, and their assembly is easy. The driving wheel further includes a compensation mechanism for ensuring clear indication of the indicated sign on the resilient strip.

14 Claims, 4 Drawing Sheets

5,632,226

BICYCLE SPEED INDICATOR

BACKGROUND OF THE INVENTION

1. Field of the Invention

The present invention relates generally to a speed indicator, and more particularly to a speed indicator adapted for use in bicycle speed control apparatuses which control the shifting devices.

2. Description of the Prior Art

Mounting a speed control apparatus on the handlebars of a bicycle for controlling the shifting actions of the bicycle is a known art. As the use of the speed control apparatus in shifting the winding member does not allow the cyclist to exactly know the control situation, there are some inventions which disclose mounting of a speed indicator on the speed control apparatus to indicate the speed of the bicycle.

One such speed indicator is described in U.S. Pat. No. 5,012,692 to Nagano. In FIG. 8 of said patent, a speed indicator resembling a ring is illustrated, but it is not described in detail in the disclosure. In U.S. Pat. No. 5,325,735, also issued to Nagano, a shifting device with a takeup reel is disclosed. A disc-like speed indicator of the shifting device connected to a crown gear is disposed on the takeup reel, and the crown gear is caused to engage with a coaxial gear so that the disc-like speed indicator is driven via a tension pulley. Such a speed indicator as taught in U.S. Pat. No. 5,325,735 is complicated in construction. And besides, as a pointer is used to indicate the numerical signs, misreading may easily occur.

There is another problem with the conventional shifting devices mounted on the handlebars of bicycles. In the conventional shifting device consisting of a speed control cable wound around the takeup reel, since the diameter of each gear does not increase in a uniformly gradual manner, when the speed control cable is wound by the takeup reel, the distance displaced by the shifting lever between any two adjacent shifts is not uniform, hence the distance between any two adjacent shifts indicated by the speed indicator will also vary. For instance, supposing the distance displaced by the speed indicator from the first shift sign to the second shift sign is 5 mm, then the distance displaced by the speed indicator from the second shift sign to the third shift sign may be 6 mm, and that from the third shift sign to the fourth shift sign may be 7.2 mm. The speed thus indicated by the speed indicator is not precise. Solution to this problem is therefore necessary.

SUMMARY OF THE INVENTION

A primary object of the present invention is to provide a speed indicator for use in bicycle speed control apparatus, which has simple construction and clear indication of speed, and which is adapted for use in vertically or horizontally oriented tracks or rails provided with indication signs or windows.

Another object of the present invention is to provide a speed indicator which has a displacement compensation mechanism whereby, after a shifting lever pushes a takeup reel to move a shift indicating plate, the displacement distance between every two adjacent shifts is indicated to be substantially the same.

According to the present invention, the speed indicator comprises a driving wheel driven by a takeup reel of a shifting device, a resilient strip driven by the driving wheel, and a track along which the resilient strip moves. When the resilient strip displaces along the track, a shift code preformed on the resilient strip is indicated via an indicating element attached to the track. The resilient strip may be adapted for use in any vertically or horizontally oriented track and it may be mounted with convenience. The driving wheel further consists of a compensation mechanism which enables clearer and more precision speed indication by means of the resilient strip in the track.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
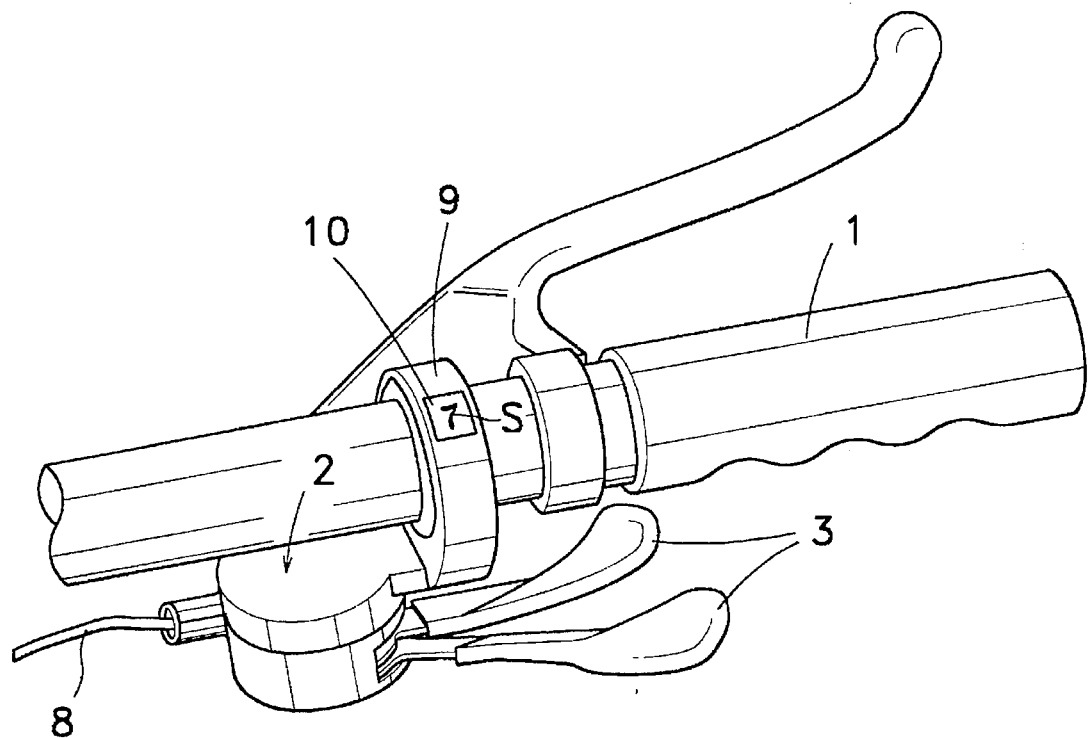
FIG. 1 is a perspective view of a preferred embodiment of the present invention, showing a speed indicator with a vertical indication cover.

The bicycle speed indicator according to the present invention may be used to indicate the situation in which bicycle transmission chains is selectively engaged with one of the gears of a freewheel gear cluster on the hub. A preferred embodiment of the speed indicator of the present invention as shown in FIGS. 1, 2, 5 and 6 essentially comprises a driving wheel 5, a resilient strip 11, and a track for guiding the resilient 11 strip to displace along a predetermined path; the track in this preferred embodiment is an indication cover 9. The driving wheel 5 is coupled to a takeup reel 4 disposed within a shifting device 2 mounted on a handlebar 1 and turns with the takeup reel 4. When a shifting lever 3 is pushed, the takeup reel 4 will turn to pull or release a cable 8. The cable 8 is provided to actuate the shifting device 2 on the bicycle frame so that a driving chain engages with One of the gears of the freewheel gear cluster to achieve the effect of changing the speed of the bicycle. As such shifting mechanism is well known in the art, it will not be described in detail herein.

The above-mentioned track may be an open one or a closed one, such as the indication cover 9 shown in the drawings. The track is configured to have a specific path for guiding the displacement of the resilient strip 11 and an indicating element, such as a bulging arrow mark, a single window, or multiple windows, for indicating or displaying one of a series of numerals or a mark formed on the resilient strip 11.

The track adopted in this preferred embodiment is the indication cover 9 shown in FIG. 1. The indication cover 9, fixed onto the handlebar 1, has a window 10, which is one of the preferred embodiments of the indicating element provided on the track. The resilient strip 11 is marked thereon a sign or signs S, such as the Arabic numerals 1 to 7 in FIGS. 2 and 3, or an easily recognizable mark in FIG. 4. The resilient strip 11 has a part thereof coupled to the driving wheel 5 and is driven thereby. And besides, one end of the resilient strip 11 may movably penetrate into the indication cover 9 to expose the sign or signs S thereon through the window 10.

Figure 4:
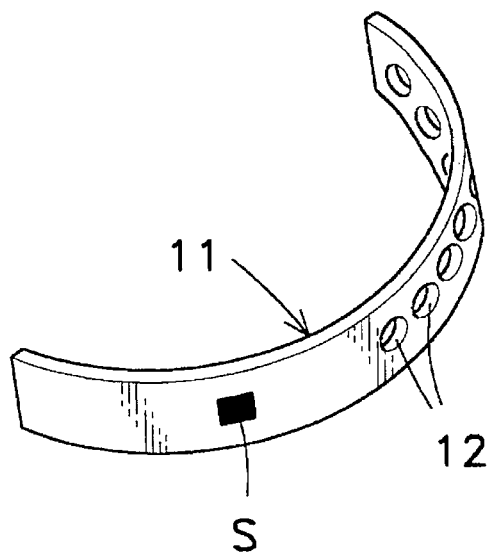
FIG. 4 is a perspective view of another preferred embodiment of the resilient strip.
Figure 5:
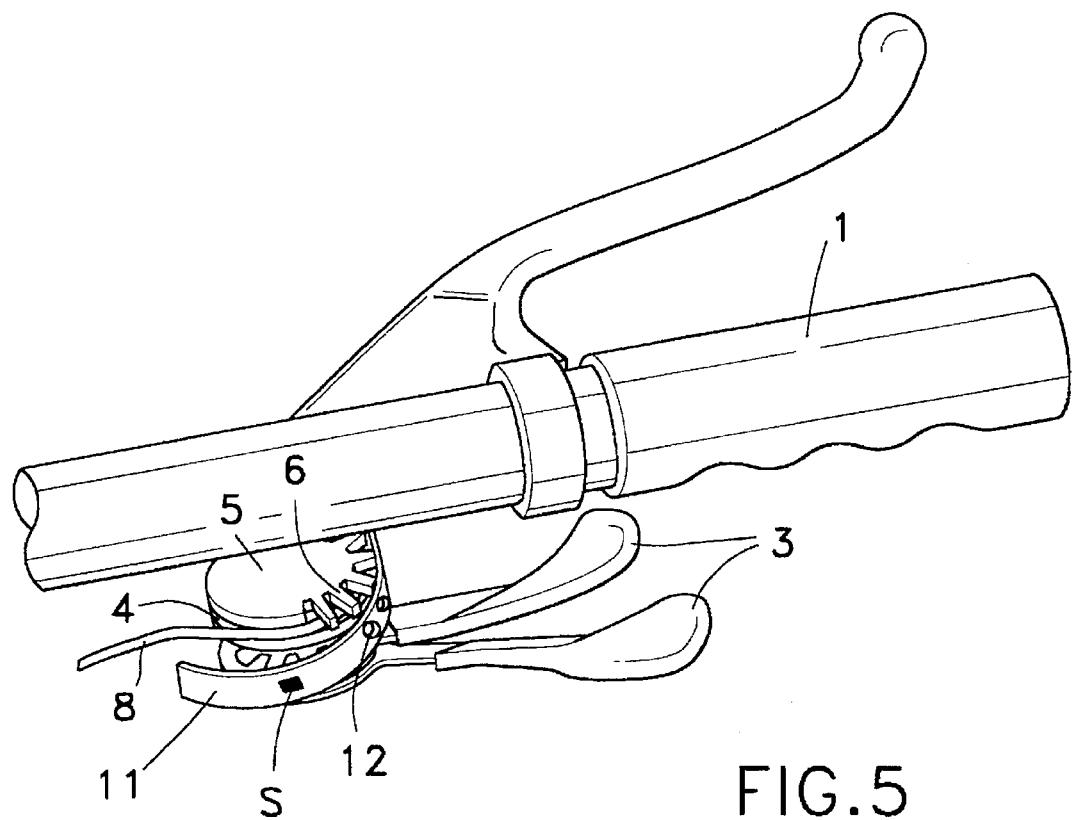
FIG. 5 is a perspective view of the present invention in an assembled state, showing use of a second preferred embodiment of the resilient strip of FIG. 4, which has a horizontal indication cover.
Figure 6:
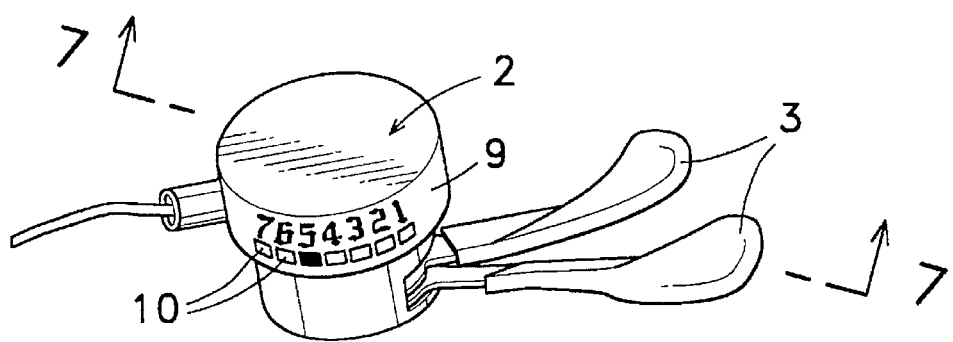
FIG. 6 is a perspective outer view of the embodiment of the present invention shown in FIG. 5.

The resilient strip 11 according to the present invention permits simple construction and assembly of the speed indicator. FIGS. 3 and 4 respectively show two preferred embodiments of the resilient strip 11. Referring to FIGS. 1, 2, 5 and 6, the sign or signs S on the resilient strip 11 may be a series of Arabic numerals (as in FIGS. 2 and 3), and relatively, the indication cover 9 has only a single window 10, so that only one number, such as 1, or 2, or 3 . . . may be displayed through the window 10 at any given time. With reference to FIGS. 4 and 5 in which the resilient strip 11 is provided with only a mark, such as a quadrilateral mark of any color, the indication cover 9 may then be provided with a plurality of juxtaposed windows with a series of Arabic numerals, such as 1, 2, 3 . . . respectively marked thereabove, so that the mark is shown through one of the windows 10. No matter whether a series of numerals or a single mark is provided on the resilient strip 11 as the signs or sign S, fluorescent material may be adopted to form the signs or sign S. The Arabic numerals shown above the windows 10 in FIG. 6 may also be formed by fluorescent materials. In this way, even in a dim environment, the cyclist can still clearly read the indicated numerals. Nonetheless, one end of the resilient strip 11 may movably penetrate into the indication cover 9 and displace with the indication cover 9 i.e., the track, along a vertical or horizontal path.

Figure 2:
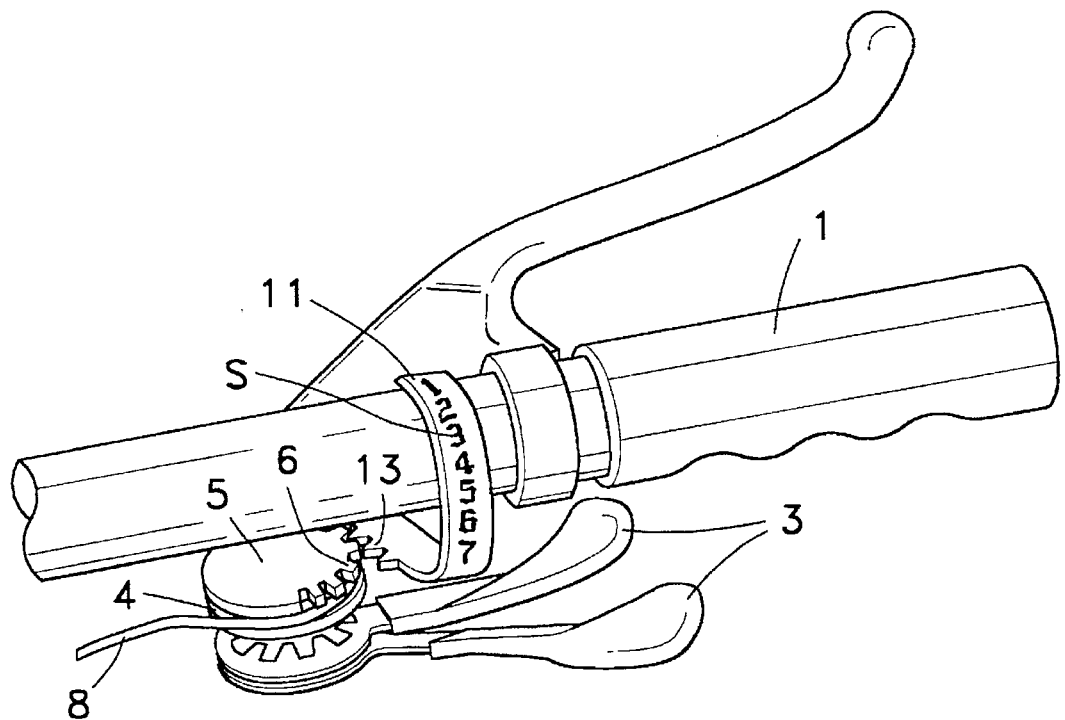
FIG. 2 is a perspective view of the preferred embodiment of the present invention shown in FIG. 1, illustrating the internal construction of the preferred embodiment in an assembled state.
Figure 3:
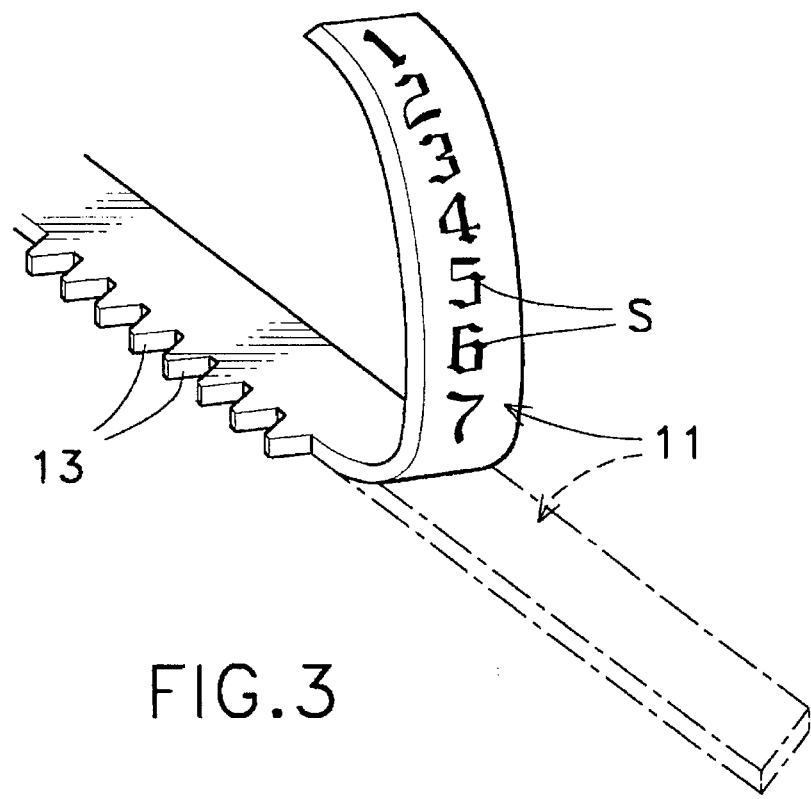
FIG. 3 is a perspective view of the resilient strip.

A preferred embodiment showing the manner of coupling the resilient strip 11 to the driving wheel 5 is illustrated in FIGS. 2 and 3. The driving wheel 5 has at least a part thereof provided with teeth 6, and the resilient strip 11 has corresponding teeth 13 provided at, for instance, a lateral rim thereof, for engaging with the teeth 6 of the driving wheel 5. Although the indication cover 9 may be configured to be an elongated box structure (not shown), it is preferably a curved one. In FIG. 1, the indication cover 9 is mounted substantially perpendicularly to the handlebar 1.

Figure 7:
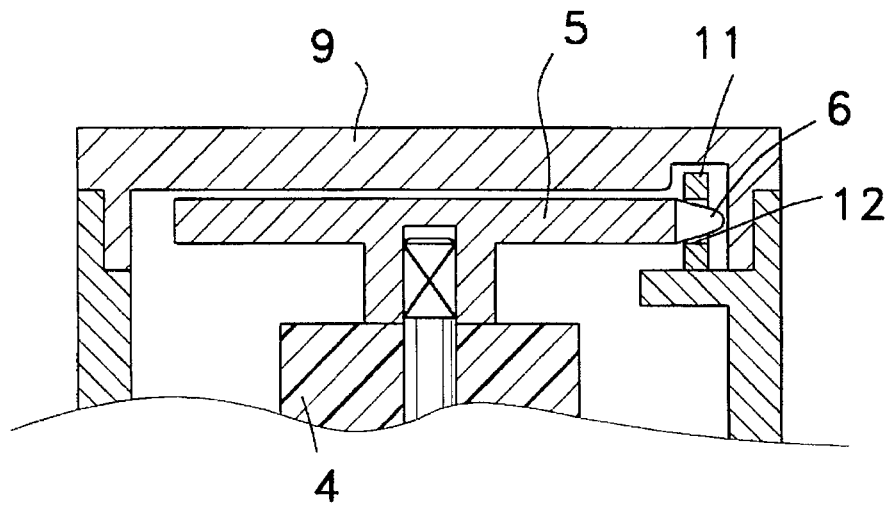
FIG. 7 is a partially sectional view taken along line 7—7 of FIG. 6.
Figure 8:
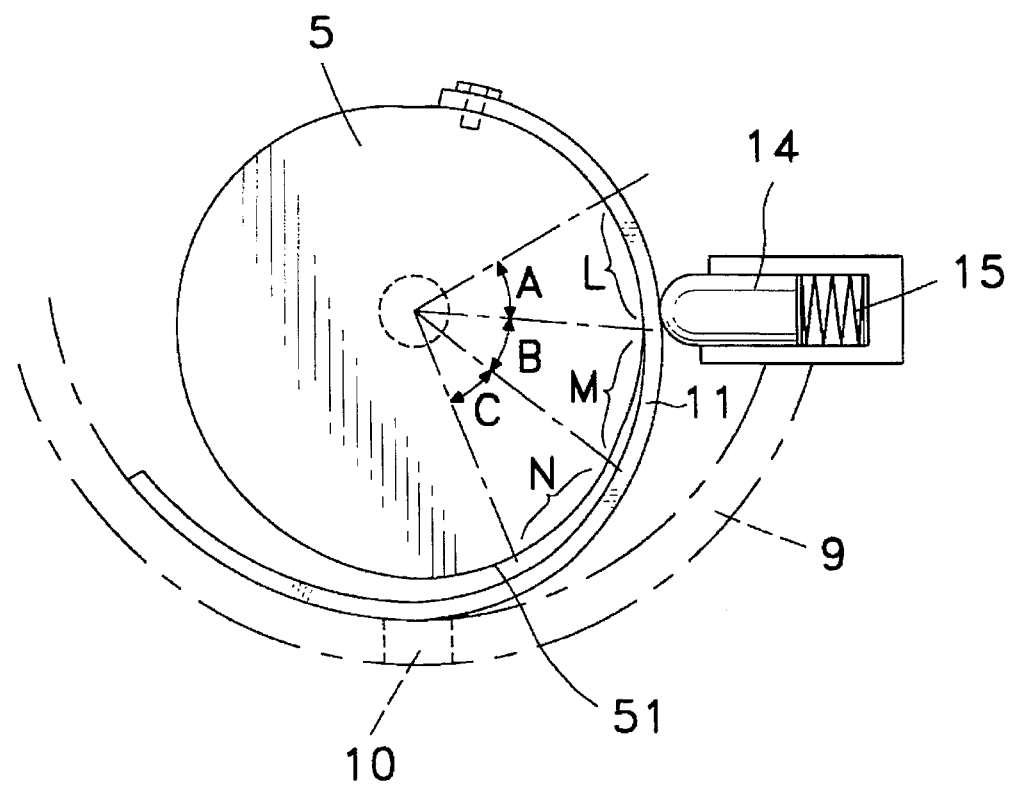
FIG. 8 is an elevational view of a third preferred embodiment of the present invention.

In FIGS. 4 and 5, the resilient strip 11 is shown to have a series of holes 12, which may engage with teeth 6 of the driving wheel 5 (see FIG. 7). When the driving wheel 5 rotates with the takeup reel 4, the resilient strip 11 will be pushed by the driving wheel 5 to move in the indication cover 9 along a pre-determined path. Those skilled in the art should understood that there are numerous ways of connecting the driving wheel 5 and the resilient strip 11, and that their manner of connection is not limited to the two ways described above. Another example of connecting the driving wheel 5 and the resilient strip 11 is shown in FIG. 8. In this example, the driving wheel 5 has a rim 51, and the resilient strip 11 has one end thereof directly fixed to the rim 51 of the driving wheel 5. When the resilient strip 11 is pressed by a means (e.g., an urging element 14 urged by a spring 15), the resilient strip 11 has at least a part thereof in close contact with the rim 51 of the driving wheel 5.

Reference is made to FIG. 8 in which a cam is adopted as an embodiment of the driving wheel 5. The rim 51 may consist of a plurality of various curved and segmented flanges or planes joined together. When the rim 51 of the cam is formed by different contiguous surfaces (planes) connected together, as shown in FIG. 8, and when the included angles e.g. A, B, C are the same, the lengths of their corresponding arcs, i.e., L, M, N are different. Conversely, when the lengths of the arcs L, M, N are the same, their corresponding included angles A, B, C are different. As described above, the takeup reel 4 will rotate through a different angle at each shifting action, so that the driving wheel 5 (cam) rotating coaxially with the takeup reel 4 will also rotate through a different angle at each shifting action. By utilizing the above-mentioned characteristic of the cam, the lengths of the arcs of the cam may be caused to be the same at each shifting action when the rotational angles of the takeup reel 4, hence the driving wheel 5 (cam), are different. The resilient strip 11 is fixed onto the rim 51 of the cam and is adhered thereto. Since the length of the arc corresponding to the rotational (included) angle of the cam at each shifting is the same, every time when the resilient strip 11 follows the cam to rotate therewith relative to the window 10 of the track, the displaced distance thereby will be the same. The resulting effect is that, when there is provided only a single window 10, the numerals marked on the resilient strip 11 may be arranged to be equi-distant from each other, without the need to space them apart from each other at specific distance as in the prior art. On the other hand, when there are provided a plurality of windows 10 (and the resilient strip 11 relatively has only a sign S), the windows 10 may be arranged at equi-distance from each other, eliminating the need to arrange them at specific distance from each other as in the prior art.

Although the present invention has been illustrated and described with reference to the preferred embodiments thereof, it should be understood that it is in no way limited to the details of such embodiments, but is capable of numerous modifications within the scope of the appended claims.

What is claimed is:

1. A bicycle speed indicator for displaying selective engagement of a transmission chain of a bicycle with one of a plurality of gears of a freewheel gear cluster provided on a hub of the bicycle, said speed indicator comprising:

a driving wheel for coupling to a takeup reel of the bicycle for accommodating within a shifting device mounted on a handlebar of the bicycle, said driving wheel for rotating with the takeup reel;

a track having an indicating element and a pre-determined guide path, said track for being fixed onto said handlebar of the bicycle; and a resilient strip having sign means corresponding to a shifting state of the bicycle, said resilient strip coupled to said driving wheel and being driven thereby, said resilient strip having a first end thereof movably inserted into said track to move along said pre-determined guide path, said sign means and said indicating element capable of alignment to display the shifting state of the bicycle;

wherein said driving wheel is a cam, said cam has a rim and said resilient strip is fixed onto said rim at a second end of said resilient strip and is urged against by a means such that at least a first part of said resilient strip adheres to said rim, said first part of said resilient strip being spaced apart from said second end.

2. A bicycle speed indicator as claimed in claim 1, wherein said track is a curved structure.

3. A bicycle speed indicator as claimed in claim 1, wherein said track is configured for substantially perpendicular attachment to said handlebar of the bicycle.

4. A bicycle speed indicator as claimed in claim 1, wherein said resilient strip moves along a substantially horizontal path.

5. A bicycle speed indicator as claimed in claim 1, wherein said track is provided in the form of an indicator cover which at least partially encloses said resilient strip and said driving wheel.

6. A bicycle speed indicator as claimed in claim 5, wherein said indicator cover has at least a window which forms at least part of said indicating element.

7. A bicycle speed indicator as claimed in claim 1, wherein said sign means on said resilient strip is made of fluorescent material.

8. A bicycle with a speed indicator for displaying selective engagement of a transmission chain of the bicycle with one of a plurality of gears of a freewheel gear cluster provided on a hub of the bicycle, said bicycle comprising:

a takeup wheel accommodated within a shifting device mounted on a handlebar of said bicycle;

a driving wheel which is coupled to said takeup reel and rotates therewith;

a track having an indicating element and a pre-determined guide path, said track being fixed onto said handlebar of the bicycle; and a resilient strip having sign means corresponding to a shifting state of the bicycle, said resilient strip coupled to said driving wheel and being driven thereby, said resilient strip having a first end thereof movably inserted into said track to move along said pre-determined guide path, said sign means and said indicating element capable of alignment to display the shifting state of the bicycle;

wherein said driving wheel is a cam, said cam has a rim and said resilient strip is fixed onto said rim at a second end of said resilient strip and is urged against by a means such that at least a first part of said resilient strip adheres to said rim, said first part of said resilient strip being spaced apart from said second end.

9. A bicycle as claimed in claim 8, wherein said track is a curved structure.

10. A bicycle as claimed in claim 8, wherein said track is substantially perpendicular to said handlebar of the bicycle.

11. A bicycle as claimed in claim 8, wherein said resilient strip moves along a substantially horizontal path.

12. A bicycle as claimed in claim 8, wherein said sign means on said resilient strip is made of fluorescent material.

13. A bicycle as claimed in claim 8, wherein said track is provided in the form of an indicator cover which at least partially encloses said resilient strip and said driving wheel.

14. A bicycle as claimed in claim 13, wherein said indicator cover has at least a window which forms at least part of said indicating element.

* * * * *